United States Patent
Mandalia et al.

(10) Patent No.: US 9,247,056 B2
(45) Date of Patent: Jan. 26, 2016

(54) IDENTIFYING CONTACT CENTER AGENTS BASED UPON BIOMETRIC CHARACTERISTICS OF AN AGENT'S SPEECH

(75) Inventors: Baiju D. Mandalia, Boca Raton, FL (US); Victor S. Moore, Lake City, FL (US); Wendi L. Nusbickel, Boca Raton, FL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2175 days.

(21) Appl. No.: 11/680,908

(22) Filed: Mar. 1, 2007

(65) Prior Publication Data
US 2008/0205624 A1     Aug. 28, 2008

Related U.S. Application Data

(63) Continuation-in-part of application No. 11/680,304, filed on Feb. 28, 2007.

(51) Int. Cl.
*H04M 1/64* (2006.01)
*H04M 3/51* (2006.01)
(Continued)

(52) U.S. Cl.
CPC ............... *H04M 3/51* (2013.01); *G10L 17/00* (2013.01); *H04M 2201/41* (2013.01)

(58) Field of Classification Search
CPC ............... H04M 2203/6018; H04M 3/2218; H04M 3/42068; H04M 3/42102; H04M 3/42365; H04M 3/5232
USPC ............ 379/265.01–265.14, 266.01–266.04, 379/88.01–88.19
See application file for complete search history.

(56) References Cited

U.S. PATENT DOCUMENTS

| 5,278,943 A | 1/1994 | Casper et al. |
| 5,774,551 A | 6/1998 | Wu et al. |

(Continued)

FOREIGN PATENT DOCUMENTS

| CN | 1697419 | 11/2005 |
| EP | 1199872 | 4/2002 |

(Continued)

OTHER PUBLICATIONS

Keidl, M., et al., "Flexible and Reliable Web Service Execution," [online] Proc. of Workshop on Entwicklung von Anwendungen auf der Basis der XML Web-Service Technologies, retrieved from the Internet: <http://citeseerx.ist.psu.edu/viewdoc/summary?doi=10.1.1.8.8890>.

(Continued)

*Primary Examiner* — Fan Tsang
*Assistant Examiner* — Solomon Bezuayehu
(74) *Attorney, Agent, or Firm* — Patents on Demand P.A.; Brian K. Buchheit; Scott M. Garrett

(57) ABSTRACT

The present invention discloses a contact center with speaker identification and verification (SIV) capabilities. In the invention, a set of contact center components can provide automated interactive communications with callers, can provide queue management for callers waiting to communicate with live agents, and can provide skills based routing for assigning live agents to callers. The SIV component can analyze speech utterances to determine a speaker identify based upon biometric characteristics of the analyzed speech utterances. Additionally, the SIV component can process speech from contact center sessions. In one embodiment, the SIV component can prevent agent substitutions from occurring of which the call center is unaware. The SIV component can also be used to distinguish whether communication session content was spoken by a contact center agent or a caller.

20 Claims, 3 Drawing Sheets

(51) Int. Cl.
   *G10L 17/00* (2013.01)
   *H04M 3/00* (2006.01)

(56) References Cited

U.S. PATENT DOCUMENTS

| | | |
|---|---|---|
| 5,781,720 A | 7/1998 | Parker et al. |
| 5,873,094 A | 2/1999 | Talatik |
| 6,049,779 A | 4/2000 | Berkson |
| 6,058,163 A | 5/2000 | Pattison et al. |
| 6,195,697 B1 | 2/2001 | Bowman-Amuah |
| 6,269,336 B1 | 7/2001 | Ladd et al. |
| 6,272,625 B1 | 8/2001 | DeCarmo |
| 6,298,370 B1 | 10/2001 | Tang et al. |
| 6,301,609 B1 | 10/2001 | Aravamudan et al. |
| 6,314,177 B1 | 11/2001 | Davis et al. |
| 6,317,794 B1 | 11/2001 | Papierniak et al. |
| 6,338,089 B1 | 1/2002 | Quinlan |
| 6,351,271 B1 | 2/2002 | Mainwaning et al. |
| 6,366,771 B1 | 4/2002 | Angle et al. |
| 6,370,508 B2 | 4/2002 | Beck et al. |
| 6,424,995 B1 | 7/2002 | Shuman |
| 6,442,547 B1 | 8/2002 | Bowman-Amuah et al. |
| 6,493,446 B1 * | 12/2002 | Cherry ............... H04M 3/36 379/265.01 |
| 6,523,035 B1 | 2/2003 | Fleming et al. |
| 6,587,558 B2 | 7/2003 | Lo et al. |
| 6,606,744 B1 | 8/2003 | Mikurak |
| 6,611,867 B1 | 8/2003 | Bowman-Amuah |
| 6,618,490 B1 | 9/2003 | Cham et al. |
| 6,662,340 B2 | 12/2003 | Rawat et al. |
| 6,704,396 B2 | 3/2004 | Parolkar et al. |
| 6,724,403 B1 | 4/2004 | Santoro et al. |
| 6,735,566 B1 | 5/2004 | Brand |
| 6,757,362 B1 | 6/2004 | Cooper et al. |
| 6,810,429 B1 | 10/2004 | Walsh et al. |
| 6,895,084 B1 | 5/2005 | Saylor et al. |
| 6,898,277 B1 | 5/2005 | Meteer et al. |
| 6,898,658 B2 | 5/2005 | Toguchi et al. |
| 6,910,074 B1 | 6/2005 | Amin et al. |
| 6,922,466 B1 | 7/2005 | Peterson et al. |
| 6,937,702 B1 * | 8/2005 | Vacek ............... H04M 3/38 379/265.04 |
| 6,970,554 B1 | 11/2005 | Peterson et al. |
| 6,972,761 B1 | 12/2005 | Cox et al. |
| 6,978,247 B1 | 12/2005 | Bogart et al. |
| 6,988,126 B2 | 1/2006 | Wilcock et al. |
| 6,996,605 B2 | 2/2006 | Low et al. |
| 7,003,079 B1 | 2/2006 | McCarthy et al. |
| 7,006,605 B1 * | 2/2006 | Morganstein et al. ..... 379/88.02 |
| 7,023,840 B2 | 4/2006 | Golla et al. |
| 7,085,728 B2 | 8/2006 | Sarlay et al. |
| 7,149,798 B2 | 12/2006 | Rezvani et al. |
| 7,177,881 B2 | 2/2007 | Schwesig et al. |
| 7,203,907 B2 | 4/2007 | Weng et al. |
| 7,210,098 B2 | 4/2007 | Sibal et al. |
| 7,233,933 B2 | 6/2007 | Horvitz et al. |
| 7,286,840 B2 | 10/2007 | Jain |
| 7,315,616 B2 | 1/2008 | Annadata et al. |
| 7,330,487 B2 | 2/2008 | Chang et al. |
| 7,334,018 B2 | 2/2008 | Elms |
| 7,336,628 B2 | 2/2008 | Chang et al. |
| 7,337,405 B2 | 2/2008 | Weng et al. |
| 7,356,567 B2 | 4/2008 | Odell et al. |
| 7,386,467 B2 | 6/2008 | Eitel et al. |
| 7,418,094 B2 | 8/2008 | Golitsin et al. |
| 7,441,261 B2 | 10/2008 | Slater et al. |
| 7,499,458 B2 | 3/2009 | McDysan et al. |
| 7,506,368 B1 | 3/2009 | Kersey et al. |
| 7,525,937 B2 | 4/2009 | O'Neill |
| 7,567,662 B1 | 7/2009 | Renner et al. |
| 7,644,351 B1 | 1/2010 | Portnoy et al. |
| 7,739,115 B1 | 6/2010 | Pettay et al. |
| RE43,255 E * | 3/2012 | Blair et al. ............... 379/67.1 |
| 2001/0027474 A1 | 10/2001 | Nachman et al. |
| 2001/0034738 A1 | 10/2001 | Cantwell et al. |
| 2001/0052023 A1 | 12/2001 | Lin et al. |
| 2002/0016736 A1 | 2/2002 | Cannon et al. |
| 2002/0052932 A1 | 5/2002 | Curtis et al. |
| 2002/0055350 A1 | 5/2002 | Gupte et al. |
| 2002/0055967 A1 | 5/2002 | Coussement |
| 2002/0056000 A1 | 5/2002 | Coussement |
| 2002/0089539 A1 | 7/2002 | Lindhorst et al. |
| 2002/0099602 A1 | 7/2002 | Moskowitz et al. |
| 2002/0103867 A1 | 8/2002 | Schilter |
| 2002/0105909 A1 | 8/2002 | Flanagan et al. |
| 2002/0120674 A1 | 8/2002 | Son et al. |
| 2002/0140731 A1 | 10/2002 | Subramaniam et al. |
| 2002/0154162 A1 | 10/2002 | Bhatia et al. |
| 2002/0169613 A1 | 11/2002 | Damiba |
| 2002/0174170 A1 | 11/2002 | Loffe et al. |
| 2002/0184346 A1 | 12/2002 | Mani |
| 2002/0184373 A1 | 12/2002 | Maes |
| 2002/0184610 A1 | 12/2002 | Chong et al. |
| 2002/0187750 A1 | 12/2002 | Majumdar |
| 2002/0194388 A1 | 12/2002 | Boloker et al. |
| 2003/0007606 A1 | 1/2003 | Suder et al. |
| 2003/0023953 A1 | 1/2003 | Lucassen et al. |
| 2003/0026269 A1 | 2/2003 | Paryani |
| 2003/0040995 A1 | 2/2003 | Daddario et al. |
| 2003/0041108 A1 | 2/2003 | Henrick et al. |
| 2003/0046088 A1 | 3/2003 | Yuschik |
| 2003/0055884 A1 | 3/2003 | Yuen et al. |
| 2003/0081751 A1 * | 5/2003 | Berstis ............... 379/202.01 |
| 2003/0088421 A1 | 5/2003 | Maes et al. |
| 2003/0095540 A1 | 5/2003 | Mulligan et al. |
| 2003/0108063 A1 | 6/2003 | Joseph et al. |
| 2003/0110297 A1 | 6/2003 | Tabatabai et al. |
| 2003/0120813 A1 | 6/2003 | Majumbar et al. |
| 2003/0156706 A1 * | 8/2003 | Koehler et al. .......... 379/265.05 |
| 2003/0182622 A1 | 9/2003 | Sibal et al. |
| 2003/0187944 A1 | 10/2003 | Johnson et al. |
| 2003/0204561 A1 | 10/2003 | Briscoe et al. |
| 2003/0212762 A1 | 11/2003 | Barnes et al. |
| 2003/0223381 A1 | 12/2003 | Schroderus |
| 2004/0039795 A1 | 2/2004 | Percival |
| 2004/0054740 A1 | 3/2004 | Daigle et al. |
| 2004/0078787 A1 | 4/2004 | Borek et al. |
| 2004/0080535 A1 | 4/2004 | Lueckhoff et al. |
| 2004/0104938 A1 | 6/2004 | Saraswat et al. |
| 2004/0128342 A1 | 7/2004 | Maes et al. |
| 2004/0133888 A1 | 7/2004 | Ard et al. |
| 2004/0146010 A1 | 7/2004 | Gass et al. |
| 2004/0162726 A1 * | 8/2004 | Chang ............... 704/247 |
| 2004/0172254 A1 | 9/2004 | Sharma et al. |
| 2004/0172258 A1 | 9/2004 | Dominach et al. |
| 2004/0181461 A1 | 9/2004 | Raiyani et al. |
| 2004/0199529 A1 | 10/2004 | Clark et al. |
| 2004/0199574 A1 | 10/2004 | Franco et al. |
| 2004/0205614 A1 | 10/2004 | Keswa |
| 2004/0208307 A1 | 10/2004 | Walker et al. |
| 2004/0215824 A1 | 10/2004 | Payrits |
| 2004/0218751 A1 | 11/2004 | Colson et al. |
| 2004/0230466 A1 | 11/2004 | Davis et al. |
| 2004/0239754 A1 | 12/2004 | Shachar |
| 2004/0243431 A1 * | 12/2004 | Katz ............... G06Q 10/10 455/405 |
| 2004/0250201 A1 | 12/2004 | Caspi |
| 2004/0254957 A1 | 12/2004 | Hyotyniemi et al. |
| 2004/0255030 A1 | 12/2004 | Sillanpaa |
| 2005/0021826 A1 | 1/2005 | Kumar |
| 2005/0027495 A1 | 2/2005 | Matichuk |
| 2005/0047579 A1 | 3/2005 | Salame |
| 2005/0060138 A1 | 3/2005 | Wang et al. |
| 2005/0069225 A1 | 3/2005 | Schneider et al. |
| 2005/0102606 A1 | 5/2005 | Sasaki et al. |
| 2005/0105712 A1 | 5/2005 | Williams et al. |
| 2005/0125541 A1 | 6/2005 | Frank et al. |
| 2005/0129198 A1 | 6/2005 | Sudhir et al. |
| 2005/0132023 A1 | 6/2005 | Cazzolla et al. |
| 2005/0136897 A1 | 6/2005 | Praveenkumar et al. |
| 2005/0137875 A1 | 6/2005 | Kim et al. |
| 2005/0147216 A1 | 7/2005 | Janakiraman et al. |
| 2005/0152522 A1 | 7/2005 | Kumhyr |
| 2005/0172331 A1 | 8/2005 | Blackketter et al. |

(56) References Cited

U.S. PATENT DOCUMENTS

| | | | |
|---|---|---|---|
| 2005/0195823 A1 | 9/2005 | Chen et al. | |
| 2005/0198099 A1 | 9/2005 | Motsinger et al. | |
| 2005/0203944 A1 | 9/2005 | Dinh et al. | |
| 2005/0251393 A1 | 11/2005 | Georgescu | |
| 2005/0261909 A1 | 11/2005 | Sienel et al. | |
| 2005/0278444 A1 | 12/2005 | Sims et al. | |
| 2005/0283364 A1 | 12/2005 | Longe et al. | |
| 2005/0286705 A1* | 12/2005 | Contolini et al. | 379/265.02 |
| 2005/0286707 A1 | 12/2005 | Erhart et al. | |
| 2006/0015600 A1 | 1/2006 | Piper | |
| 2006/0023864 A1 | 2/2006 | Krahn | |
| 2006/0023865 A1* | 2/2006 | Nice | H04M 3/5232 |
| | | | 379/265.04 |
| 2006/0031077 A1 | 2/2006 | Dalton et al. | |
| 2006/0036770 A1 | 2/2006 | Hosn et al. | |
| 2006/0069563 A1 | 3/2006 | Ju et al. | |
| 2006/0074980 A1 | 4/2006 | Sarkar | |
| 2006/0101143 A1 | 5/2006 | Garcia et al. | |
| 2006/0104433 A1* | 5/2006 | Simpson et al. | 379/266.07 |
| 2006/0112400 A1 | 5/2006 | Zhang et al. | |
| 2006/0126816 A1* | 6/2006 | Shaffer et al. | 379/265.02 |
| 2006/0168002 A1 | 7/2006 | Chesley | |
| 2006/0176901 A1 | 8/2006 | Terai et al. | |
| 2006/0182258 A1* | 8/2006 | Sisselman et al. | 379/265.02 |
| 2006/0190580 A1 | 8/2006 | Shu et al. | |
| 2006/0195584 A1 | 8/2006 | Baumann | |
| 2006/0200569 A1 | 9/2006 | Koch et al. | |
| 2006/0200754 A1 | 9/2006 | Kablesh et al. | |
| 2006/0212511 A1 | 9/2006 | Garcia-Martin | |
| 2006/0282856 A1 | 12/2006 | Errico et al. | |
| 2006/0287866 A1 | 12/2006 | Cross et al. | |
| 2007/0005990 A1 | 1/2007 | Sathish | |
| 2007/0026852 A1 | 2/2007 | Logan et al. | |
| 2007/0047715 A1 | 3/2007 | Madhusudan et al. | |
| 2007/0049281 A1 | 3/2007 | Chen et al. | |
| 2007/0071224 A1 | 3/2007 | Shtivelman et al. | |
| 2007/0081557 A1 | 4/2007 | Binetti et al. | |
| 2007/0100981 A1 | 5/2007 | Adamczyk et al. | |
| 2007/0106510 A1* | 5/2007 | Hsing et al. | 704/246 |
| 2007/0109979 A1 | 5/2007 | Fu et al. | |
| 2007/0116223 A1 | 5/2007 | Burke et al. | |
| 2007/0124507 A1 | 5/2007 | Gurram et al. | |
| 2007/0132834 A1 | 6/2007 | DaPalma et al. | |
| 2007/0133507 A1 | 6/2007 | DaPalma et al. | |
| 2007/0133508 A1 | 6/2007 | DaPalma et al. | |
| 2007/0133509 A1 | 6/2007 | Da Palma et al. | |
| 2007/0133511 A1 | 6/2007 | DaPalma et al. | |
| 2007/0133512 A1* | 6/2007 | Da Palma et al. | 370/352 |
| 2007/0133513 A1 | 6/2007 | Da Palma et al. | |
| 2007/0133769 A1 | 6/2007 | Da Palma et al. | |
| 2007/0133773 A1 | 6/2007 | Da Palma et al. | |
| 2007/0136420 A1 | 6/2007 | Da Palma et al. | |
| 2007/0136421 A1 | 6/2007 | DaPalma et al. | |
| 2007/0136436 A1 | 6/2007 | DaPalma et al. | |
| 2007/0136442 A1 | 6/2007 | DaPalma et al. | |
| 2007/0136448 A1 | 6/2007 | DaPalma et al. | |
| 2007/0136449 A1 | 6/2007 | DaPalma et al. | |
| 2007/0136793 A1 | 6/2007 | DaPalma et al. | |
| 2007/0147355 A1 | 6/2007 | DaPalma et al. | |
| 2007/0180075 A1 | 8/2007 | Chasman et al. | |
| 2007/0201676 A1 | 8/2007 | Gillis et al. | |
| 2007/0266075 A1 | 11/2007 | Jachner | |
| 2007/0286180 A1* | 12/2007 | Marquette et al. | 370/356 |
| 2007/0288247 A1* | 12/2007 | Mackay | 705/1 |
| 2008/0003964 A1 | 1/2008 | Alperin et al. | |
| 2008/0031459 A1* | 2/2008 | Voltz | H04L 9/083 |
| | | | 380/279 |
| 2008/0037752 A1 | 2/2008 | Chatilov et al. | |
| 2008/0086564 A1 | 4/2008 | Putman et al. | |
| 2008/0167914 A1* | 7/2008 | Ikeda et al. | 705/7 |
| 2008/0183852 A1 | 7/2008 | Pramer et al. | |
| 2008/0192908 A1 | 8/2008 | O'Keefe et al. | |
| 2009/0254757 A1* | 10/2009 | Toyama et al. | 713/186 |
| 2010/0218084 A1* | 8/2010 | Sivadas et al. | 715/234 |

FOREIGN PATENT DOCUMENTS

| | | |
|---|---|---|
| EP | 1237349 A2 | 9/2002 |
| EP | 1484903 A2 | 12/2004 |
| FR | 2844127 A1 | 3/2004 |
| WO | 0005903 | 2/2000 |
| WO | 0131472 | 5/2001 |
| WO | 03079144 | 9/2003 |

OTHER PUBLICATIONS

Engelsma, J., et al., Distributed Multimodal Synchronization Protocol; IETF Standard-Working Draft, Internet Engineering Task Force, IETF, CH, Jul. 8, 2005, pp. 1-71.

Georgescu, J.C., et al. "Multimodal IMS Services: The Adaptive Keyword Spotting Interaction Paradigm," [online] ICAS-ICNS 2005, Int'l Conf. Autonomic and Autonomous Systems / Int'l Conf. on Networking and Services pp. 21, 2005 [retrieved Jun. 4, 2010] retrieved from the Internet: <http://www.computer.org/portal/web/csdl/doi/10.1109/ICAS-ICNS.2005.67>.

Bodel, M., et al., "W3C Multimodal Interaction Citation," [online] May 6, 2003, pp. 1-19, XP002305381; [retrieved Jun. 4, 2010] retrieved from the Internet: <http://www.w3.org/TR/mmi-framework/>.

U.S. Pat. No. 7,706,521, Office Action 1, Dec. 30, 2008.
U.S. Pat. No. 7,706,521, Office Action 2, Jul. 2, 2009.
US Pub. No. 2007/0133773, Office Action 1, Dec. 9, 2008.
US Pub. No. 2007/0133773, Final Office Action 1, May 29, 2009.
US Pub. No. 2007/0133773, Final Office Action 2, May 21, 2010.
US Pub. No. 2007/0133509, Office Action 1, Dec. 10, 2008.
US Pub. No. 2007/0133509, Final Office Action 1, Jun. 24, 2009.
US Pub. No. 2007/0133513, Office Action 1, Feb. 26, 2010.
US Pub. No. 2007/018957 Office Action 1 (Mar. 5, 2010).

Olsson, D., et al., "MEP—A Media Event Platform", Mobile Networks and Applications, Kluwer Academic Publishers, vol. 7, No. 3, pp. 235-244, 2002.

Atkins, D., et al., "Common Presence and Instant Messaging: Message Format," [online] Internet Engineering Task Force, IETF, CH, vol. IMPP, No. 8, Jan. 9, 2003, [retrieved on Feb. 7, 2008] retrieved from the Internet: <http://tools.ietf.org/html/draft-ietf-impp-cpim-msgfmt-08>.

Peterson, J., "Common Profile for Presence (CPP)," [online] Internet Engineering Task Force, IETF, CH, vol. IMPP, No. 4, Aug. 14, 2003, [retrieved on Feb. 7, 2008] retrieved from the Internet: <http://tools.ietf.org/html/draft-ietf-impp-pres-04>.

Sugano, H., et al., "Prsence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Schulzrinne, H., et al., "RPID: Rich Presence Extensions to the Presence Information Data Format (PIDF)," [online] Internet Engineering Task Force, IETF, CH, Jul. 1, 2006, [retrieved on Feb. 7, 2008] retrieved from the Internet: <http://www.ietf.org/rfc/rfc4480.txt>.

Notice of Allowance dated Dec. 9, 2009 in related application, U.S. Appl. No. 11/684,397.

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

Brabrand, C., et al., "The <bigwig> Project", ACM Transactions on Internet Technology, vol. 2, No. 2, pp. 79-114, May 2002.

Fielding, R.T., et al., "Principled Design of the Modern Web Architecture", ACM Transactions on Internet Technology, vol. 2, No. 2, pp. 115-150, May 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

* cited by examiner

IDENTIFYING CONTACT CENTER AGENTS BASED UPON BIOMETRIC CHARACTERISTICS OF AN AGENT'S SPEECH

CROSS-REFERENCE TO RELATED APPLICATIONS

This continuation-in-part application claims the benefit of U.S. patent application Ser. No. 11/680,304 filed 28 Feb. 2007, which is hereby incorporated by reference herein.

BACKGROUND

1. Field of the Invention

The present invention relates to the field of contact center technologies and, more particularly, identifying contact center agents based upon biometric characteristics of an agent's speech 2. Description of the Related Art Historically, contact center agents have been placed in operations centers where they work along side many other contact center agents. Each agent has operated from an agent-specific desktop, which includes a data terminal and phone connection. Contact center agents have been identified based upon a user name and password combination and/or based upon an identifier of a device (e.g., phone or terminal) used by the agent.

Conventionally, front end software that drives the agent desktop has been part of a vendor-specific solution that connects the agent to contact center backend components, which are also vendor-specific. The protocols, hardware, and software used by the different vendors have historically been incompatible with one another, requiring all contact center components to be those of a single vendor.

In a related application (U.S. patent application Ser. No. 11/680,304 entitled "IMPLEMENTING A CONTACT CENTER USING OPEN STANDARDS AND NON-PROPRIETARY COMPONENTS"), Applicants have disclosed an open contact center which describes a technique for implementing a contact center based upon open standards, which are independent upon any specific vendor. An open contact center permits interactions to occur using standard hardware and software devices. For example, an agent can interact with contact center components using standard telecommunication devices, such as a SIP based phone and/or a HTTP based browser. Use of standards based hardware can permit contact center agents to work outside a centralized operations center. That is, in an open contact center environment, contact center agents can seamlessly work from remote locations, such as from their home or from geographically separated small office locations. Basically, agents of an open contact center would be able to work from any location so long as a network connection exists that permits them to communicate with the open contact center backend system.

Further, use of open standards within a contact center combined with an ability to integrate geographically distributed agents can create an opportunity for independent knowledge brokers to sell their services to one or more contact centers. For example, a doctor, lawyer, computer technician, and the like, can work from their own office and sell their services by the hour to many different contact centers. These contact centers benefit because they do not have to employ skilled agent on a full time basis, but can instead dynamically obtain services of the independent knowledge brokers as needed. Customers benefit as well by being granted access to a large pool of skilled professionals. Knowledge brokers are provided with a new competitive market in which they can sell their skills.

Conventional agent identifying techniques lack a fraud resistant means of identifying an agent. That is, basing agent identity solely on a user name or device identity (i.e., conventional identification techniques) can be easily spoofed by dishonest agents. For example, an agent could initially authenticate themselves with a contact center and then substitute a representative to handle calls in their place. Callers, and/or the call center would remain unaware of the substitution, which could result in an unqualified or untrained call center agent handling customer issues. Further, a contact center could be paying a premium for an agent believed to have exceptional skills, when in fact a substitute, who would normally be paid at a lower rate, is handling calls.

SUMMARY OF THE INVENTION

The present invention identifies contact center agents based upon biometric characteristics of an agent's speech. More specifically, recorded and/or live contact center communications can be speech processed using speaker identify verification (SIV) techniques. The contact center can be implemented using standardized components and protocols, which permit agents to use a front end interface (e.g., a HTTP browser and/or a SIP phone) connected to backend contact components over a standard network. In one embodiment, the contact center components can be vendor independent, Service Oriented Architecture (SOA) components.

The SIV techniques can be advantageously used in the context of a contact center in many different manners. For example, during agent authorization, the agent can be required to speak a phrase, which is analyzed (e.g., voice print analysis) to ensure that the speaker is the intended agent instead of another individual using the agent's hardware and/or password. During contact center communication sessions, agent speech can be repetitively sampled to ensure that a substitute has not replaced the contact center agent who is intended to handle the caller issues.

In another example, SIV techniques can be used to automatically distinguish a caller's utterances from those of a contact center agent. One use of this technique is to automatically determine if an inappropriate phrase, such as cursing, was uttered by an agent (who can be disciplined for cursing) or a caller. Another use can be to increase speaker identification accuracy for transcription purposes.

The present invention can be implemented in accordance with numerous aspects consistent with the material presented herein. For example, one aspect of the present invention can include a contact center including a set of contact center components and a SIV component. The contact center components can provide automated interactive communications with callers, can provide queue management for callers waiting to communicate with live agents, and can provide skills based routing for assigning lie agents to callers. The SIV component can analyze speech utterances to determine a speaker identify based upon biometric characteristics of the analyzed speech utterances. Additionally, the SIV component can process speech from contact center sessions to automatically identify at least one contact center agent involved in each of the contact center sessions. In one embodiment, the SIV component can be repetitively used to prevent agent substitutions from occurring of which the call center is unaware. In another embodiment, the SIV component can be used to distinguish whether communication session content was spoken by a contact center agent or a caller. Speaker determination can be important for transcriptions, for detecting an origin of inappropriate phrases (e.g., cursing), and other purposes.

Another aspect of the present invention can include a contact center, which includes an agent desktop, a portal server, an application server, and a SIV component. The agent desktop can include a standard Hypertext Transfer Protocol (HTTP) based browser and a standard phone. The agent desktop can permit an agent to handle call center communications. The portal server can provide an agent portal, through which the agent utilizing the agent desktop communicates. The agent portal can include a set of agent portlets within which contact center information is presented. The application server can execute contact center applications and can be configured to receive input for the contact center applications from the agent portlets and to present contact center output through the agent portlets.

Still another aspect of the present invention can include a method for identifying contact center agents based upon voice characteristics. In the method, a contact center can receive speech content that is associated with a communication session involving a contact center agent. Biometric characteristics can be extracted from the speech content. These extracted biometric characteristics can be compared against previously stored biometric characteristics associated with at least one contact center agent. Results of this comparison can be used to determine an identify of a speaker of the speech content. These extracted biometric characteristics can be compared against previously stored biometric characteristics associated with at least one contact center agent. Results of this comparison can be used to determine an identify of a speaker of the speech content. The contact center can then perform at least one programmatic action based upon results of the determined identity.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiment which are presently preferred, it being understood, however, that the invention is not limited to the precise arrangements and instrumentalities shown.

DETAILED DESCRIPTION OF THE INVENTION

Figure 1:
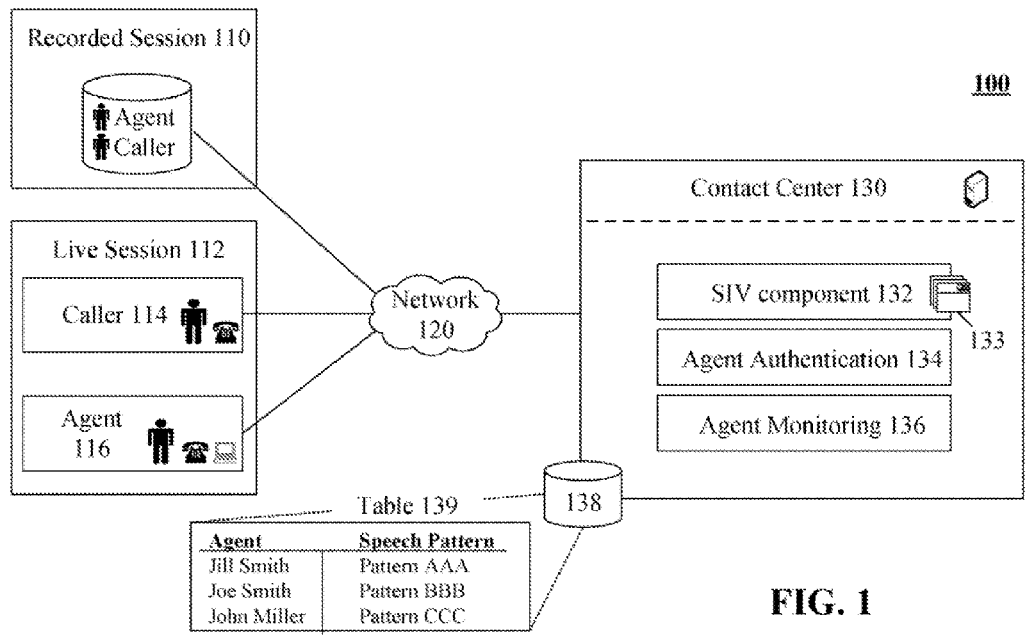
FIG. 1 is a schematic diagram of a system in which a contact center uses speaker identify verification (SIV) techniques to identify contact center agents in accordance with an embodiment of the inventive arrangements disclosed herein.

FIG. 1 is a schematic diagram of a system 100 in which a contact center 130 uses speaker identify verification (SIV) techniques to identify contact center agents in accordance with an embodiment of the inventive arrangements disclosed herein. The contact center 130 can be a functional area used by one or more organizations to handle inbound/outbound communications with callers 114. Callers 114 can be transferred from an automated response component of the call center 130 to available agents 116 based on the skills needed to handle the caller's issues and based upon expertise possessed by agent 116. Thus, a live communication session 112 can be conducted between the caller 114 and contact center agent 116. These sessions can be recorded 110 to be later analyzed by an agent monitoring component 136.

The contact center 130 can include an SIV component 132, which can automatically determine a speaker identify based on biometric information contained in speech waves. The SIV component 132 can be associated with one or more speaker identify applications 133 and/or one or more speaker verification applications 133. Both types of applications 133 compare previously stored speech patterns and/or speech characteristics associated with a particular speaker (as shown by table 139 in data store 138) with biometrics extracted form a speech sample.

A speaker identify application 133 can determine which registered speaker (e.g., a caller 114 or agent 116) provides a given utterance during a session 110, 112 and can use this information to perform a contact center 130 task. For example, a pattern matching algorithm can analyze session spoken phrases to determine if any inappropriate phrases, which can be defined using a configurable phrase list, were spoken. When these phrases were spoken by a caller 114 alone, the agent monitoring 136 component can reward an agent 116 for maintaining their composure and/or for professionally calming the caller 114 during a latter part of a contact center session 110, 112. When an inappropriate phrase is spoken by an agent 116 (as determined by the SIV component 132) a corrective or punishing action can be taken by the agent monitoring component 136 to prevent future occurrences of these inappropriate phrases by that agent 116.

A speaker verification application 133 can be configured to accept or reject an identify claim of a speaker, such as agent 116. For example, an agent can initially be prompted by an agent authentication 134 component to provide identifying information. That is, during login, an agent can provide a user name and password combination, a device identifier for a used communication device, and/or a spoken phase that is analyzed by SIV component 132. The agent authentication component 134 can intermittently verify that the authorized agent 116 who logged into the contact center 130 has not been replaced with a substitute. In other words, a speaker verification application 133 can execute code to determine if the logged agent 116 is participating in a session 110, 112. If not, corrective actions can be taken.

The SIV component 132 can utilize a variety of identify determining techniques to perform verification and/or identification tasks based upon speech segments. The SIV component 132 can correlate identify with physiological and behavioral characteristics of the speaker. These characteristics exist both in the spectral envelope (e.g., vocal tract characteristics) and in the supra-segmental features (e.g., voice source characteristics and dynamic features spanning several segments). In one embodiment, the SIV component 132 can use Linear Predictive Coding (LPC)-derived cepstral coefficients and their regression coefficients for short-term spectral measurements. Further, the SIV component 132 can accommodate vocal variations of a speaker using a parameter domain normalization technique or a distance/similarly domain technique. The speaker identify technique used by SIV component 132 can be text dependent (e.g., using a dynamic time warping algorithm) or text independent (e.g., using a vector quantization algorithm). SIV component 132 is not to be construed as limited to any particular technique or technology, as any of a variety of techniques/technologies can be advantageously used by the contact center 130 in accordance with inventive details described herein.

The agent authentication component 134 can identify an agent and upon successful authentication can provide the agent with access to contact center 130 resources. For instance, an agent can login using a user id and password, which is submitted to the contact center using a Web interface. In one embodiment, the authentication function can be provided by WEBSPHERE Application Server (WAS) and Portal Server (PS) JAVA security facilities.

The agent monitoring component 136 can permit call center agents to be monitored for quality assurance or training from virtually any location. In one embodiment, the agent monitoring component 136 can be provided using the WEBSPHERE Portal Server (WPS) and a reporting component (not shown). For example, agent interactions can be viewed/analyzed using the reporting component for items such as average call handling time, number of calls handled per hours, etc. One of the supervisor's portlets in their Web browser can contain a view of the call center agents, along with access to the agent reporting database, which can include agent specific statistics. The supervisor portlet can permit a supervisor to access agent information from any Web browser, once the supervisor has been properly authenticated by the agent authentication component 134. In one embodiment, real-time statistics can be provided by the agent monitoring component 136, which can even permit the supervisor to silently conference into/observe a real-time agent/caller interaction. This conferencing may require use of additional functions of contact center 130.

Figure 2:
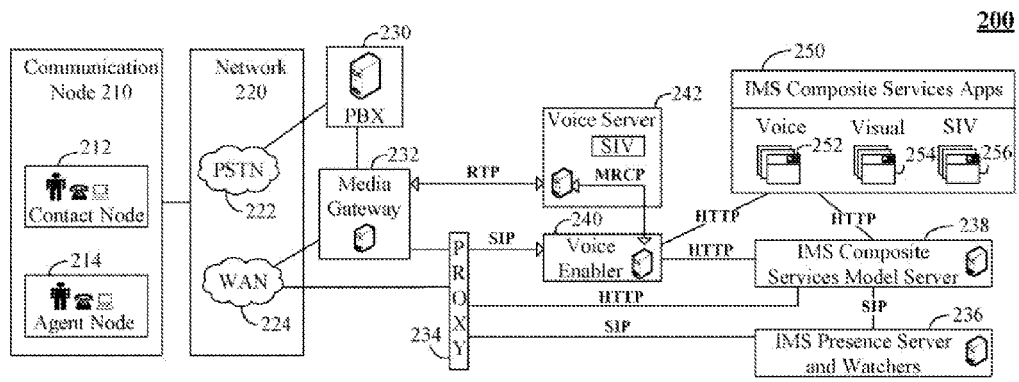
FIG. 2 is a schematic diagram of a system for implementing an open contact center that includes SIV capabilities in accordance with an embodiment of the inventive arrangements disclosed herein.

FIG. 2 is a schematic diagram of a system 200 for implementing an open contact center that includes SIV capabilities in accordance with an embodiment of the inventive arrangements disclosed herein. The system 200 can represent one contemplated embodiment of system 100. As defined herein, an open contact center includes components that interact based upon open standards. Use of open standards indicates that specifics of communication protocols, interfaces with components of the open contact center, and the like, are published and available to third party vendors who can construct solutions or enhancements to the open contact center by conforming to the published standards. Open standards can include, but are not limited to, Extensible Markup Language (XML) based standards, service-oriented architecture (SOA) based standards, Real-time Transport Protocol (RTP) based standards, Media Resource Control Protocol (MRCP) based standards, Hyper Text Transfer Protocol (HTTP) based standards, Session Initiation Protocol (SIP) based standards, and the like. Open standards are often established by an independent standard setting body, such as the Internet Engineering Task Force (IETF), World Wide Web Consortium (W3C), etc., or by a cooperating consortium of multiple independent businesses, such as IBM, Sun Microsystems, and the like. Open standards, as used herein, can exist even though one or more companies maintains intellectual property rights to open contact center concepts, such as those presented in the instant application.

In system 200, a communication node 210 of a caller (e.g., contact node 212) and/or an agent (e.g., agent node 214) are linked to network 220. Network 220 can include Public Switched Telephone Network (PSTN) components 222 and wide area network (WAN) 224 components. The PSTN 222 can interface with a Private Branch Exchange (PBX 230) which routes calls to media gateway 232. The media gateway 232 can interact with the voice server 242 and the voice enabler 240 using open standards, such as RTP based standards and MRCP based standards. Call provisioning applications (e.g., CCXML based applications) can be used for call provisioning (e.g., DNIS to VXML application) functions.

System 200 can utilize an IMS composite services model server 238 to handle IMS composite services applications 250, which can replace single modality applications commonly used in legacy contact centers. The composite services applications 250 can include voice applications 252, visual applications 254, and SIV applications 256. The contact node 212 and the agent node 214 can each interact with the contact center using many different modalities, such as voice, instant messaging, Web form interactions during sessions, and the like. Each communication node 210 can interface using standard hardware and software, such as a SIP phone and Web browser with LOTUS Lightweight Messaging (LWM) and Blocks Extensible Exchange Protocol (BEEP). Asynchronous JavaScript and XML (AJAX) and HTTP or other communication techniques for exchanging information with the agent node 214 can be used in place of LWM and BEEP. WEBSPHERE PS and agent portlets can be used to interface with the Web browser for added scalability and security.

IMS presence server and watchers 236 can be used in system 200 to detect available agents and their skills and to monitor contact center interactions. In one embodiment, collaboration components can be implemented using IBM WORKPLACE or other such components. The voice enabler 240 can be implemented using IBM's VOICE ENABLER, the voice server 242 can be implemented using WEBSPHERE voice server, and the proxy 234 can be implemented using WAS EDGE SERVER LOAD BALANCER or WAS SIP PROXY.

It should again be emphasized that although component implementation specifics for one contemplated embodiment have been described using IBM WEBSPHERE middleware, the invention is not so limited. Any middleware solution or standards based solution can be used in place of the IBM WEBSPHERE specific component described herein, using adaptations and software techniques commonly performed by software engineers and developers, which do not require undue experimentations or inventive efforts. For example, WEBSPHERE components can be replaced by components from a different software platform, such as BEA WEBLOGIC application server from BEA Systems, Inc. of San Jose, Calif., a JBOSS application server from JBoss, Inc. of Atlanta, Ga., a JOnAS application server from the ObjectWeb Consortium, the .NET software platform, and the like.

Figure 3:
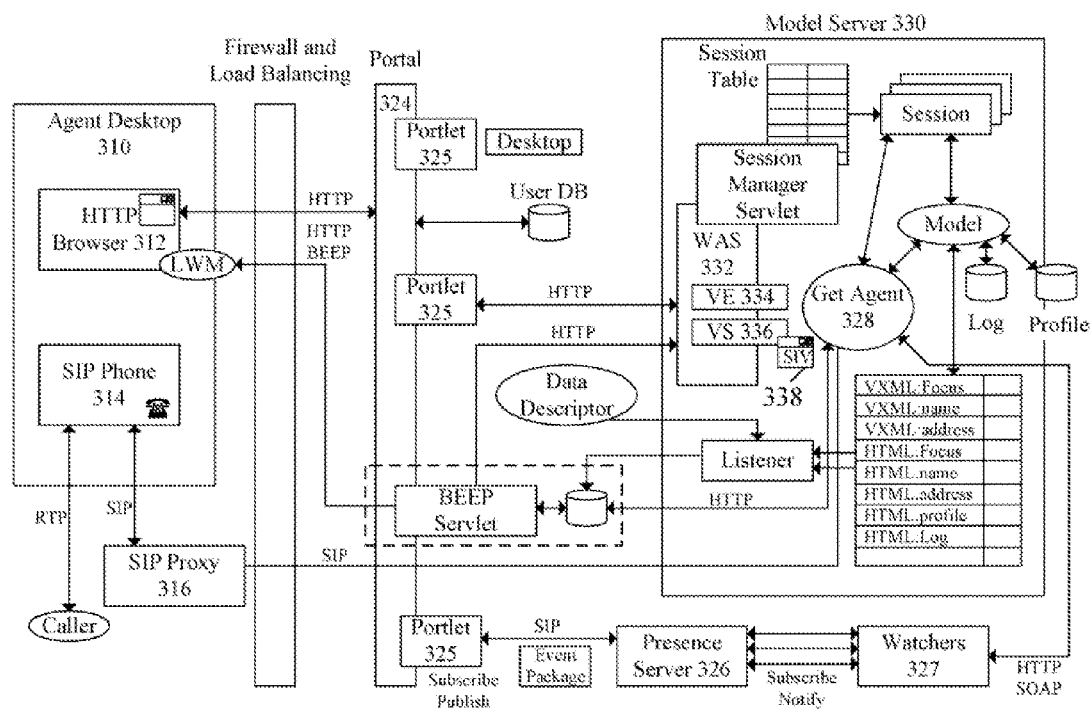
FIG. 3 is a schematic diagram of a standards based contact center having SIV capabilities shown from an agent perspective.

FIG. 3 is a schematic diagram of a standards based contact center 300 having SIV capabilities shown from an agent perspective. Center 300 represents one particular embodiment for system 100. Specific components of center 300 are implemented using WEBSPHERE enabled components and associated tooling. It should be noted that center 300 utilizes WEBSPHERE enabled components for illustrative purposes only and the scope of the invention is not to be construed as limited in this regard. Other middleware solutions and standards based solutions can be substituted and adapted to achieve approximately equivalent results.

As illustrative scenario for center 300 can show how the components interact. In this scenario, a call can come in over a telephone to the contact center 300 using a standard telephone, where the call is transferred to an agent connected to contact center components using agent desktop 310. The agent can utilize any personal computer in an operations center as the agent desktop 310 and is not constrained to a particular station. The agent can also remotely (i.e., external to an operations center, such as through a home computer) connect to contact center components using a Web browser 312 and SIP based telephone 314. The agent can sign onto portal 324 via an agent desktop portlet 325. For example, the agent can enter a user id and password and hit a SUBMIT button.

The desktop agent 310 portlet can call the WEBSPHERE PRESENCE SERVER (WPS) 326 with a publish/subscribe mechanism. An IP address of the agent's SIP phone 314, browser 312, BEEP address, and other information including agent expertise and agent utilization can be conveyed to the presence server 326. After login onto the system, a default screen can be presented in the browser 312 that indicates that the agent is active and available.

At this time, a call between a caller on a phone and the contact center 300 can be active. In a running VXML application, the WEBSPHERE Voice Enabler (VE) 334 can prompt a user for input. The BE 334 can interact with the voice server (VS) 336 to determine user context information and a purpose of a call. The caller responses can indicate that agent assistance is needed. For example, a caller can select a dialog option to speak with a live agent. The VXML application can transfer the caller to an agent transfer servlet co-located with the SIP proxy 316. The transfer can be conducted using a get agent 328 function, which uses one or more expertise specific watchers 327 to detect a suitable agent having a caller needed expertise. Presence information of the agents and caller can be managed by presence server 326. Once the transfer is made, the agent can receive the call using the SIP phone 314 and can receive caller specific data via the browser 312.

During or after (i.e., the session can be recorded and later analyzed) the communication session, one or more SIV applications 338 can execute within the voice server 336. For example, one SIV application 338 can verify that the individual using the agent desktop 310 is the agent who is supposed to be handling the call and is not a substitute. In another example, the SIV application 338 can be used to determine whether a spoken comment during the communication session was made by an agent or by a caller.

Figure 4:
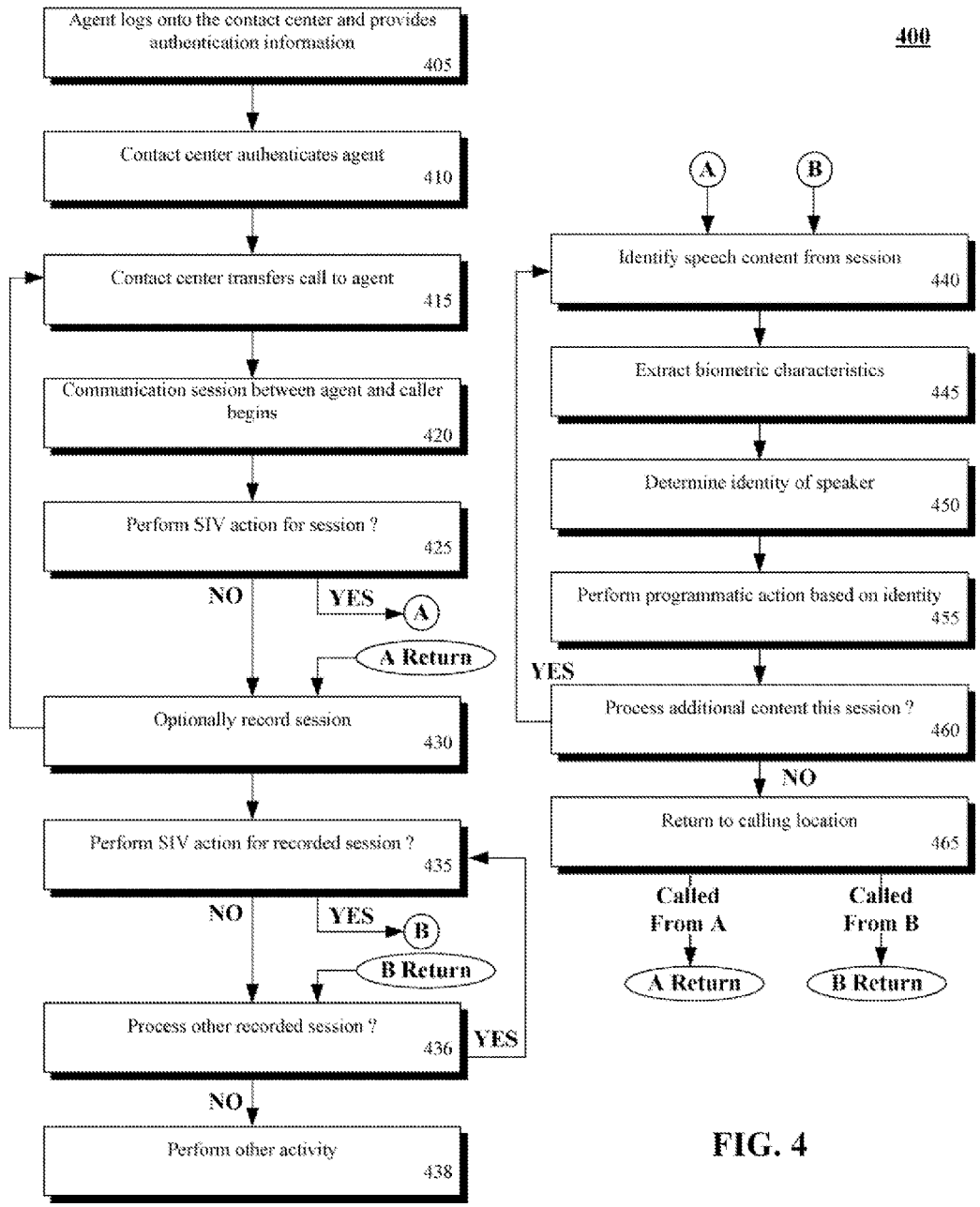
FIG. 4 is a flow chart of a method in which a contact center determines identity of a speaker based upon speech characteristics in accordance with an embodiment of the inventive arrangements disclosed herein.

FIG. 4 is a flow chart of a method 400 in which a contact center determines identify of a speaker based upon speech characteristics in accordance with an embodiment of the inventive arrangements disclosed herein. Method 400 can be performed in the context of a system 100 or other contact center system.

Method 400 can begin in step 405, where an agent logs onto a contact center by providing authentication information. The authentication information can include a user name and password, one or more device identifiers, and/or speech input which is processed by a SIV component. In step 410, the contact center can authorize the agent. Backend contact center components, such as a presence server and associated watchers, can be updated to indicate that the authorized agent is now available to handle caller communications.

In step 415, the contact center can transfer a call to the agent. The caller can be placed in a waiting queue (not shown) if the agent is busy handling another caller. A communication session between the caller and the agent can begin in step 420. In step 425, a determination can be made as to whether a SIV action is to be performed for the session. In one embodiment, this can be a real-time SIV action, which can trigger a programmatic action that affects the active session. When no SIV action is to be performed in step 425, the method can proceed to optional step 430, where the session can be provided. The method can loop from step 430 to step 415, where another caller can be transferred to the contact center agent.

In asynchronous step 435, a determination can be made to perform an SIV action involving the recorded session. When no SIV action is to be performed against the recorded session in step 435, the method can proceed to step 436, where other recorded sessions can be optionally analyzed. The method loops from step 436 to step 435 when another recording is to be processed using an SIV technique. When all recordings have been analyzed, the method can proceed to step 438, where other activities can be performed, or where the method can end.

When one or more SIV actions are to be performed in either step 425 or step 435, the method can progress to step 440, where a portion of speech content from the communication session can be identified. In step 445, biometric characteristics of a speaker can be extracted from the identified speech content. In step 450, a speaker identify can be determined from the extracted biometrics. For example, a voice print analysis can indicate that the speech context was spoken by a contact center agent. In step 455, a programmatic action can be initiated based upon the determined identify. For example, if the speech content confirms or verifies the identify of a contact agent is proper, that agent can be credited for the transaction by a payroll program. In another example, the speech content can include inappropriate phrases (e.g., curses) and corrective or punishment actions can be taken against an agent should the agent be the individual who spoke the inappropriate phrases. In step 460, a determination can be made as to whether further speech content for the session is to be processed. If so, the method can loop to step 440. When all desired content has been processed, the method can proceed to step 465, where the method can return execution to the original processing point. That is, when the original exit was from step 425, the method can proceed from step 465 to step 430 and when the original exit was from step 435, the method can proceed from step 465 to step 436.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A contact center comprising:
   the contact center configured to provide automated interactive communications with callers, providing queue management for callers waiting to communicate with live human agents, and providing skills based routing for assigning live human agents to callers; and
   a speech identification and verification (SIV) component configured to analyze speech utterances and configured to determine a speaker identity based upon biometric characteristics of the analyzed speech utterances, wherein said SIV component processes speech from contact center sessions that are each between a caller and a human agent to automatically identify the human agent of the contact center involved in each of the contact center sessions based on the biometric characteristics of the speech utterances of that human agent, wherein said SIV component determines whether the human agent that logged into the contact center with a user identifier uniquely assigned to the human agent is indeed the human agent involved in the contact center sessions.

2. The contact center of claim 1, wherein a use of the SIV component prevents agent substitutions from occurring of which the call center is unaware, wherein substitutions for which prevention occurs are each a substation where a human who is not the human agent substitute for the human agent by using the user identifier and password of the human agent.

3. The contact center of claim 1, further comprising:
   speech processing components that automatically convert the speech utterances to text, which is further processed by software stored in a machine readable medium, wherein results of the further processing is used by the contact center, wherein the speech identification and verification (SIV) component is used to distinguish which of the human agent and the caller spoke particular ones of the analyzed speech utterances during each one of the contact center sessions, wherein the converted text is linked to a speaker of content of the converted text based upon results produced by the SIV component.

4. The contact center of claim 1, further comprising:
   an agent desktop comprising an HTTP browser and a SIP based phone each based upon open standard, wherein the agent desktop is configured to operate as an interface between the contact center agents and the contact center.

5. The contact center of claim 1, further comprising:
   a portal server configured to provide an agent portal, through which the contact center agents communicate, said agent portal including a plurality of agent portlets within which contact center information is presented; and
   a standards based Web browser within which the agent portal is presented, wherein the Web browser is part of an agent desktop that is configured to operate as an interface between the contact center agents and the contact center.

6. The contact center of claim 1, further comprising:
   a plurality of contact center components conforming to open standards that intercommunicate utilizing open standards, said components together forming the contact center.

7. The contact center of claim 6, wherein each of the contact center components execute within a middleware solution having IP Multimedia Subsystem (IMS) capabilities.

8. The contact center of claim 6, wherein each of the contact center components are service oriented architecture (S OA) components.

9. A method for contact centers to identify contact center agents based upon voice characteristics of the human agents comprising:
   a human agent logging onto a contact center and providing authentication information that includes a user name unique to that human agent and a corresponding password for the user name;
   the contact center authenticating the agent using the authentication information;
   the call center transferring a caller to the human agent to initiate a contact center communication session between the human agent and the caller;
   receiving speech content associated with the contact center communication session;
   extracting biometric characteristics contained within the speech content of the contact center communication session;
   comparing the extracted biometric characteristics against previously stored biometric characteristics associated with the human agent;
   determining an identity of a speaker of the content based upon results of the comparing step;
   comparing the identity of the speaker with an identity of a human associated with the user name, wherein the comparison is performed to verify that a human logged in as the human agent via the user name is in fact the speaker;
   a contact center performing at least one programmatic action based upon results of the determined identity, wherein the programmatic action is determining whether inappropriate phrases spoken during the communication session were attributable to the human agent or to the caller and taking corrective or punishment actions against the human agent when the human agent is determined to have spoken the inappropriate phrases.

10. The method of claim 9, wherein said contact center communication session includes speech of the human agent and a contact center customer, and wherein said received speech content is a segment of speech provided by the human agent and the contact center customer, said determining step further comprising:
    determining utilizing a software program stored in a machine readable memory which one of the human agent and the contact center customer provided said speech content, wherein said determined identity is one of the human agent and the contact center customer.

11. The method of claim 10, further comprising:
    speech-to-text converting said received speech content;
    matching converted text with a previously defined entry in a set of watched words; and
    based upon said matching step, triggering the determining step, wherein said programmatic action is at least one of an agent monitoring action, a supervisor notification action, a supervisor conferencing action, and a programmatic action that changes a performance rating associated with the contact center agent.

12. The method of claim 10, further comprising:

automatically transcribing the speech of the contact center communication session, wherein different speakers are indicated based upon results of the determining step.

13. The method of claim 9, wherein the programmatic action is an agent verification action, said method further comprising:

verifying that the identity matches an identity of a contact agent to whom the contact center directed a caller for live interactions during the communication session.

14. The method of claim 9, further comprising:

automatically converting the speech content to text; and adding speaker identifying text to the converted text that indicates which of the contact center agent and a caller provided the associated converted text, wherein the added speaker identifying text is based on results of the determining step.

15. The method of claim 9, wherein the programmatic action verifies whether or not the a human logged in as the human agent via the user name is in fact the human agent or is a different human substituting for the human agent.

16. The method of claim 9, wherein the steps of claim 9 are performed by a plurality of contact center components conforming to open standards that intercommunicate utilizing open standards, said components together forming the open contact center, said contact center providing automated interactive communications with callers, providing queue management for callers waiting to communicate with call center agents, providing skills based routing for assigning live agents to callers based upon skills of the live agents and skills needed by the callers, and providing tooling for provisioning and monitoring the contact center agents.

17. The method of claim 9, wherein the programmatic action determines whether inappropriate phrases spoken during the communication session were attributable to the human agent or where attributable to the caller, wherein the programmatic action takes corrective or punishment actions against the human agent when the human agent is determined to have spoken the inappropriate phrases, and wherein the program action does not take corrective or punishment actions against the human caller when the caller is determined to have spoken the inappropriate phrases.

18. A contact center comprising:

an agent desktop comprising a standard HTTP browser and a standard phone, wherein the agent desktop is configured to permit a human agent to handle call center communications;

a portal server configured to provide an agent portal, through which the human agent utilizing the agent desktop communicates, said agent portal including a plurality of agent portlets within which contact center information is presented, wherein a speech identification and verification (SIV) component determines whether the human agent that logged into the contact center with a user identifier uniquely assigned to the human agent is indeed the human agent involved in the contact center sessions;

an application server executing contact center applications configured to receive input for the contact center applications from the agent portlets and to present contact center output through the agent portlets; and the SIV component configured to analyze speech utterances and configured to determine a speaker identity based upon biometric characteristics of the analyzed speech utterances, wherein said SIV component processes speech from contact center sessions to automatically identify whether a segment of speech content spoken during a contact center session between a caller and a human using the agent desktop, was spoken by the human agent of the contact center or not based upon comparing biometric characteristics of the segment of speech content with previously stored biometric characteristics of the human agent, wherein said SIV component determines whether the human agent that logged into the contact center is the human agent involved in the contact center sessions.

19. The contact center of claim 18, wherein communications between the agent desktop and that contact center conform to open standards, said open standards consisting of a hypertext transfer protocol (HTTP) based standard and a Session Initiation Protocol (SIP) based standard.

20. The contact center of claim 18, wherein the software and hardware of the contact center is based upon industry standards, wherein the interfaces and communication protocols for the contact center use open standards, and wherein the contact center has IP Multimedia Subsystem (IMS) capabilities.

* * * * *